Oct. 22, 1940.          O. LUND ET AL          2,219,093
TWO-STROKE INTERNAL COMBUSTION ENGINE
Filed Jan. 27, 1939          2 Sheets-Sheet 1
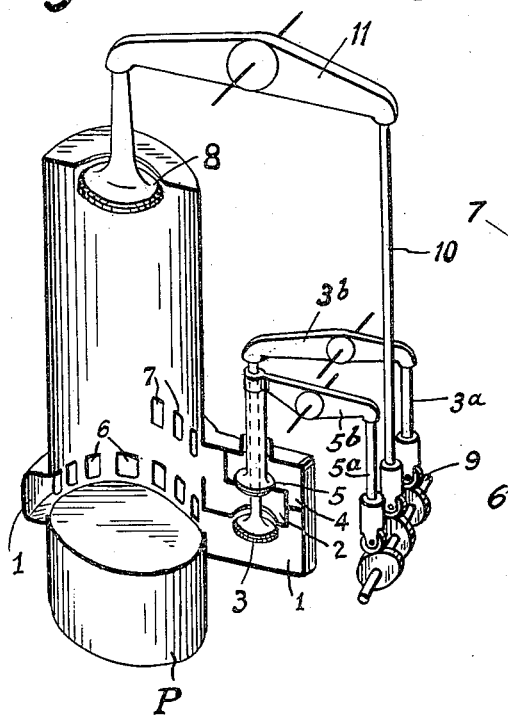
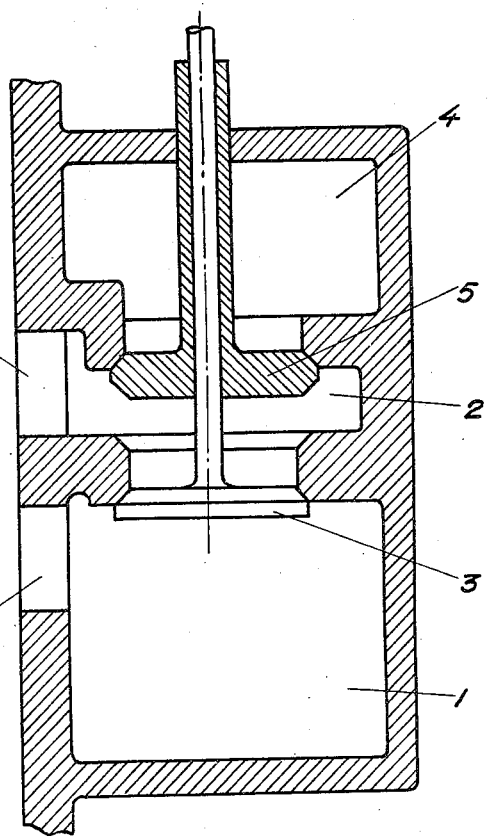
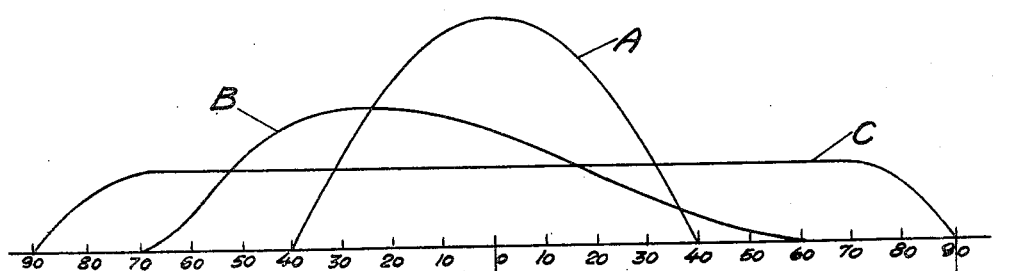
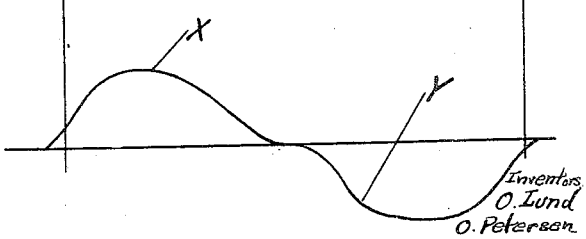
Inventors
O. Lund
O. Petersen
by: Glascock Downing & Seebold
Attys Oct. 22, 1940.  O. LUND ET AL  2,219,093
TWO-STROKE INTERNAL COMBUSTION ENGINE
Filed Jan. 27, 1939  2 Sheets-Sheet 2
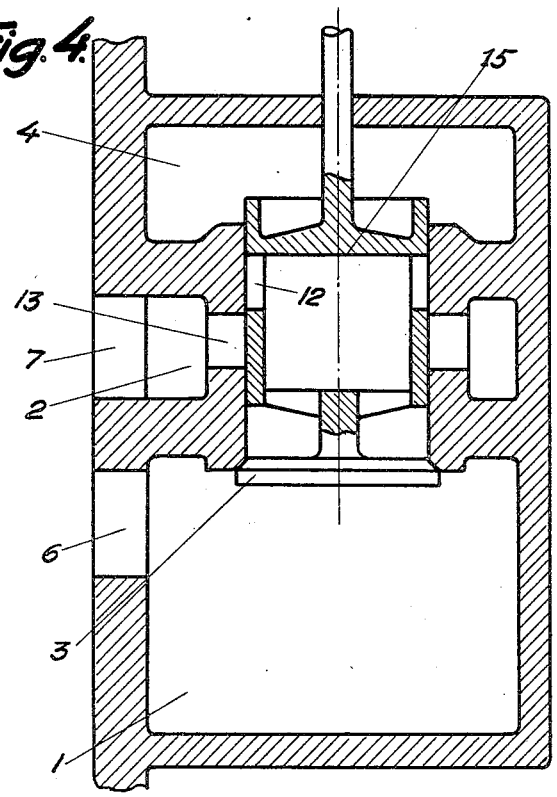
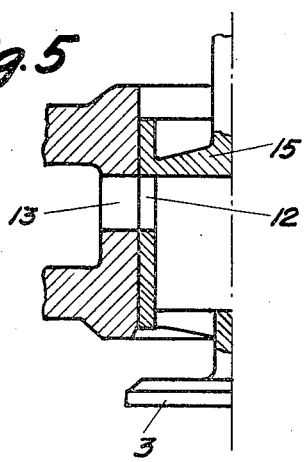
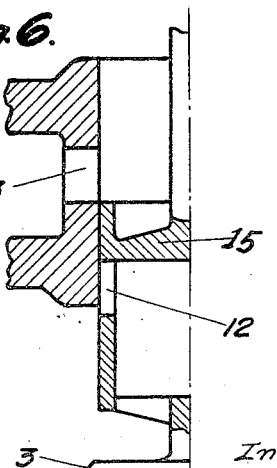
Inventors
O. Lund +
O. Petersen Patented Oct. 22, 1940

2,219,093

UNITED STATES PATENT OFFICE 2,219,093

TWO-STROKE INTERNAL COMBUSTION ENGINE

Otto Lund, Hellerup, near Copenhagen, and Ove Petersen, Gentofte, near Copenhagen, Denmark Application January 27, 1939, Serial No. 253,208 In Denmark February 1, 1938

4 Claims. (Cl. 123—65)

This invention relates to internal combustion engines operating upon the two stroke cycle and more particularly to engines which are scavenged and charged with low-pressure scavenging air and subsequently supercharged with higher compressed supercharging air.

The primary object of the invention is to construct an engine of this kind in which the scavenging and charging are performed in such a manner as to clear each cylinder absolutely of exhaust gases with a minimum of scavenging air at a very low pressure above atmospheric and to supercharge the cylinder to a considerable overpressure without having to increase the pressure of the scavenging air.

With this and other objects in view the invention consists in the combinations of features described in the following and specified in the appended claims.

The invention is illustrated in the accompanying drawings, where:

Figure 1 is a diagrammatic perspective view partly broken away of a cylinder of a two-stroke internal combustion engine according to the invention, Figure 2 is a diagram showing the function of the controlling means, Figure 3 is a section on a larger scale of the controlling means for the scavenging air and the supercharging air, Figures 4, 5 and 6 are sections of a modification of the controlling means with their movable parts in three different positions.

The engine cylinder represented in Figure 1 is surrounded in the usual manner by a scavenging air manifold 1 communicating through a series of ports 6 evenly distributed along the periphery of the cylinder with the interior of the cylinder, when the working piston P is near its lower dead centre.

Above the ports 6 are another set of ports 7 communicating with an annular chamber 2 extending along part of the periphery of the cylinder. Outside and above the annular chamber 2 is another chamber 4, to which compressed supercharging air is led from a supercharging blower (not shown). The communication between the supercharging air chamber 4 and the annular chamber 2 is controlled by a valve 5 actuated by an engine operated cam shaft 9 through a rod 5a and lever 5b, while the communication between the scavenging air manifold 1 and the annular chamber 2 is controlled by an engine-operated valve 3 actuated from the same cam shaft 9 through a rod 3a and lever 3b.

The operation of the described arrangement is as follows: When the piston approaches its lower dead centre during the expansion stroke, the discharge of the combustion gases is allowed in the usual manner through an exhaust valve 8 situated in the top of the cylinder and controlled from the cam shaft 9 by a push rod 10 and a lever 11. Likewise in the usual manner the ordinary scavenging ports 6 are uncovered by the piston and the cylinder is scavenged with low pressure scavenging air from the manifold 1. At the same time the communication between the scavenging air manifold 1 and the annular chamber 2 is effected by opening the valve 3 by the action of a suitable cam on the cam shaft 9, and in this way a controlled scavenging with low-pressure scavenging air is obtained through the chamber 2 and ports 7. The cylinder is scavenged and charged in this way with air entering under a comparatively low super-pressure at exactly controlled moments the admission taking place without remarkable throttling resistance. Thus the scavenging is carried out with the least possible consumption of air and without imparting undesired whirling motions to the scavenging air by its passing through throttling resistances.

When the cylinder has been scavenged and charged, the supply of high-pressure supercharging air is opened through the ports 7 simultaneously with the communication between the scavenging air manifold 1 and the annular chamber 2 being positively cut off. In the constructional form of the controlling means shown in Figure 3 this is attained by the valve 5 which controls the communication between the supercharging air chamber 4 and the annular chamber 2, and is a double seated valve, which at the same time opens the passage of supercharging air and bears against an opposite seat to shut off the scavenging air. The admission of supercharging air into the cylinder ceases, when the piston covers the ports 7 during its upward stroke, and thereupon the valves 3 and 5 are returned in their original positions.

The controlling means may, e. g., be so adjusted as to act in the manner illustrated in the diagram Figure 2, the abscissa axis of which represents the angular position of the crank in relation to the lower dead centre, while the curves A and B represent the time areas for the opening of the controlling means. Thus the curve A represents the time areas for the ports 6, curve B for the exhaust valve 8, curve C for the supercharging ports 7, and curves $x$ and $y$ for the controlled valves 3 and 5 respectively.

In the modification shown in Figures 4 to 6 of the controlling means for the scavenging and supercharging air the supply of scavenging air to the ports 7 is controlled as above described by a valve 3 situated between the scavenging air manifold 1 and the annular chamber 2, while the access of the supercharging air to the ports is controlled by a tubular slide valve built together with the valve 3.

In the position shown in Figure 4 the supply both of scavenging and supercharging air is cut off. When the combined slide and valve moves down to the position in Figure 5, the valve 3 is opened and scavenging air is allowed to pass into the chamber 2 through ports 12, 13 in the said tubular slide and its seat. When the slide is in this position, the supply of supercharging air is still cut off by the unbroken top 15 of the slide. When the slide is lowered still more to the position shown in Figure 6, its top 15 cuts off the supply of scavenging air and opens at the same time the passage of supercharging air through the ports 13.

As above said, it is obtained by the invention that the scavenging, charging and supercharging of the cylinder take place in a particularly advantageous and exactly controlled manner and, at the same time, that the consumption of scavenging air and the consumption of energy by the blower is reduced to a minimum. For instance, the invention makes it possible to employ a volume of scavenging air which is very little, e. g. 5% at most, larger than the total stroke volume of the cylinder.

We claim:

1. A two-stroke internal combustion engine having in each cylinder a set of piston-controlled scavenging ports in the vicinity of the outer dead center position of the piston, a set of auxiliary ports above the first mentioned set of ports, positively controlled means for controlling the supply of low pressure scavenging air to the auxiliary ports, positively controlled means for controlling the supply of higher compressed super-charging air to the auxiliary ports, and exhaust means arranged at the opposite end of the cylinder as regards the set of scavenging ports and auxiliary ports.

2. A two-stroke internal combustion engine having in each cylinder a set of piston-controlled scavenging ports in the vicinity of the outer dead center position of the piston, a set of auxiliary ports above the first mentioned set of ports, a separate positively controlled means for admitting low pressure scavenging air to the auxiliary ports, positively controlled means for controlling the supply of super-charging air to the auxiliary ports and being arranged to positively cut off the admission of scavenging air thereto when opening the admission of super-charging air, and exhaust means arranged at the opposite end of the cylinder as regards the set of scavenging ports and auxiliary ports.

3. A two-stroke internal combustion engine as claimed in claim 2 in which the said valve means comprises two valves disposed co-axially, one of the said valves controlling the super-charging air and being constructed as a double valve, which on abutting one seat cuts off the admission of super-charging air to the set of auxiliary ports but on being moved onto the second seat cuts off the admission of scavenging air to the said set of ports.

4. A two-stroke internal combustion engine as claimed in claim 2, in which the said valve means comprises a valve adapted to control the admission of scavenging air to the set of auxiliary ports, the stem of said valve being constructed as an axially displaceable tubular slide, which controls the cutting off of the admission of the scavenging air to the said set of ports and the opening as well as the cutting off of the admission of super-charging air thereto.

OTTO LUND.
OVE PETERSEN.